United States Patent
Riazi et al.

(10) Patent No.: US 11,308,226 B1
(45) Date of Patent: Apr. 19, 2022

(54) SECURE COLLABORATIVE PROCESSING OF PRIVATE INPUTS

(71) Applicant: CipherMode Labs, Inc., Los Angeles, CA (US)

(72) Inventors: Mohammad Sadegh Riazi, Los Angeles, CA (US); Ilya Razenshteyn, Newcastle, WA (US)

(73) Assignee: CipherMode Labs, Inc., Los Angeles, CA (US)

( * ) Notice: Subject to any disclaimer, the term of this patent is extended or adjusted under 35 U.S.C. 154(b) by 0 days.

(21) Appl. No.: 17/387,671

(22) Filed: Jul. 28, 2021

Related U.S. Application Data

(60) Provisional application No. 63/152,235, filed on Feb. 22, 2021.

(51) Int. Cl.
| | |
|---|---|
| *G06F 21/60* | (2013.01) |
| *G06F 3/06* | (2006.01) |
| *G06F 9/44* | (2018.01) |
| *G06F 21/53* | (2013.01) |
| *G06F 9/50* | (2006.01) |
| *G06F 9/445* | (2018.01) |
| *G06F 8/41* | (2018.01) |

(52) U.S. Cl.
CPC .......... *G06F 21/602* (2013.01); *G06F 3/0604* (2013.01); *G06F 3/0655* (2013.01); *G06F 3/0679* (2013.01); *G06F 8/44* (2013.01); *G06F 9/445* (2013.01); *G06F 9/5027* (2013.01); *G06F 21/53* (2013.01); *G06F 2221/033* (2013.01); *H04L 2209/46* (2013.01)

(58) Field of Classification Search
None
See application file for complete search history.

(56) References Cited

U.S. PATENT DOCUMENTS

| | | | | |
|---|---|---|---|---|
| 8,321,666 | B2 * | 11/2012 | Kerschbaum | G06F 21/556 |
| | | | | 713/164 |
| 8,868,925 | B2 * | 10/2014 | Wyatt | G06F 21/53 |
| | | | | 713/189 |
| 9,054,865 | B2 * | 6/2015 | Gan | H04L 9/32 |
| 9,177,153 | B1 * | 11/2015 | Perrig | G06F 21/57 |

(Continued)

FOREIGN PATENT DOCUMENTS

| | | | | |
|---|---|---|---|---|
| EP | | 3716082 A1 * | 9/2020 | ......... G06F 12/1027 |
| WO | WO-2016019294 A1 * | | 2/2016 | ............. G06F 3/061 |

OTHER PUBLICATIONS

'Three-Party ORAM for Secure Computation' by Sky Faber et al., Proceedings, Part I, of the 21st International Conference on Advances in Cryptology—ASIACRYPT 2015—vol. 9452, Nov. 2015. (Year: 2015).*

(Continued)

*Primary Examiner* — Steven G Snyder
(74) *Attorney, Agent, or Firm* — Amin, Turocy & Watson, LLP

(57) ABSTRACT

The described technology is generally directed towards secure collaborative processing of private inputs. A secure execution engine can process encrypted data contributed by multiple parties, without revealing the encrypted data to any of the parties. The encrypted data can be processed according to any program written in a high-level programming language, while the secure execution engine handles cryptographic processing.

18 Claims, 11 Drawing Sheets

(56) References Cited

U.S. PATENT DOCUMENTS

| | | | |
|---|---|---|---|
| 10,248,324 B2 * | 4/2019 | Pass | G06F 3/0623 |
| 10,614,242 B2 * | 4/2020 | Rogers | G06F 21/6245 |
| 10,917,235 B2 * | 2/2021 | Gama | G06N 3/08 |
| 2010/0146501 A1 * | 6/2010 | Wyatt | G06F 21/84 718/1 |
| 2014/0289535 A1 * | 9/2014 | Gan | G06F 21/53 713/189 |
| 2014/0372769 A1 * | 12/2014 | Kerschbaum | H04L 9/008 713/189 |
| 2017/0212679 A1 * | 7/2017 | Pass | G06F 13/387 |
| 2017/0242961 A1 * | 8/2017 | Shukla | H04L 63/0281 |
| 2018/0005186 A1 * | 1/2018 | Hunn | G06F 40/103 |
| 2018/0096166 A1 * | 4/2018 | Rogers | H04W 12/02 |
| 2019/0103961 A1 * | 4/2019 | Chhabra | H04L 9/0825 |
| 2020/0090552 A1 * | 3/2020 | Feng | G09C 1/00 |
| 2020/0304293 A1 * | 9/2020 | Gama | G06F 17/16 |
| 2020/0358601 A1 * | 11/2020 | Gama | H04L 9/00 |
| 2020/0401715 A1 * | 12/2020 | Linton | G06F 21/6218 |
| 2021/0117395 A1 * | 4/2021 | Wang | G06F 21/602 |
| 2021/0135850 A1 * | 5/2021 | Hoang | H04L 9/008 |
| 2021/0203504 A1 * | 7/2021 | Brandt | G06F 9/30025 |
| 2021/0257088 A1 * | 8/2021 | Melchionne | G16H 40/67 |
| 2021/0304214 A1 * | 9/2021 | Abad | G06Q 20/382 |

OTHER PUBLICATIONS

'Efficient Maliciously Secure Multiparty Computation for RAM' by Marcel Keller et al., EUROCRYPT 2018, LNCS 10822, pp. 91-124, 2018. (Year: 2018).*

'Distributed Oblivious RAM for Secure Two-Party Computation' by Steve Lu et al., TCC 2013, LNCS 7785, pp. 377-396, 2013. (Year: 2013).*

'SCORAM: Oblivious RAM for Secure Computation' by Xiao Shaun Wang et al., CCS'14, Nov. 3-7, 2014. (Year: 2014).*

Songhori et al., "ARM2GC: Succinct Garbled Processor for Secure Computation," Design Automation Conference (DAC), Jun. 2018, 6 pages.

Wang et al., "Secure Computation of MIPS Machine Code," ESORICS 2016: Computer Security—ESORICS 2016 pp. 99-117, 26 pages.

Keller,"The Oblivious Machine or: How to Put the C into MPC," Progress in Cryptology—LATINCRYPT 2017 (pp. 271-288), 30 pages.

* cited by examiner 401 assign x y
402 jump x
403 bge x y z
404 bgeu x y z
405 add x y z
406 sub x y z
407 and x y z
408 or x y z
409 xor x y z
410 shl x y z
411 shr x y z
412 shra x y z

SECURE COLLABORATIVE PROCESSING OF PRIVATE INPUTS

CROSS REFERENCE TO RELATED APPLICATION

This is a non-provisional claiming priority to U.S. Provisional Patent Application No. 63/152,235, filed Feb. 22, 2021, and entitled "Systems and Methods for Secure and Private Execution of Computer Programs," the entirety of which application is hereby incorporated by reference herein.

TECHNICAL FIELD

The subject application is related to secure and private data processing. In particular, the subject application relates to systems and methods to securely execute programs with private inputs from multiple parties, without disclosing the private inputs.

BACKGROUND

With the rapid growth of sensitive digital information and digital assets, data security and privacy are ever more important. Traditional cryptosystems protect data confidentiality at the cost of data utility. The encrypted data does not reveal information about the underlying data and can guarantee confidentiality. However, one cannot compute on encrypted data using traditional cryptosystems. In order to perform computations, the data has to be decrypted, at which point it becomes vulnerable.

Moreover, in many scenarios, collaboration across different organizations, each in possession of their own respective private data, can be beneficial to facilitate scientific progress and accelerate economic growth. However, such collaborations are currently frustrated by the inability to collaborate without risking exposure of the private data. Leveraging secure multiparty computation protocols requires a significant development process, deep cryptographic expertise, and rigorous security analysis. As a result, the use of such multiparty computation protocols is out of reach for most organizations.

The above-described background is merely intended to provide a contextual overview of some current issues, and is not intended to be exhaustive. Other contextual information may become further apparent upon review of the following detailed description.

SUMMARY

One or more aspects of the technology described herein are generally directed towards secure collaborative processing of private inputs. Embodiments of this disclosure can provide secure processing of encrypted data, where the encrypted data can be contributed by multiple parties, and where the encrypted data can be processed without revealing the encrypted data to any of the parties. Furthermore, the encrypted data can be processed according to any program written in a high-level programming language. The program need not include cryptographic processing features that require cryptographic expertise to create.

Secure collaborative processing of private inputs according to this disclosure can include processing encrypted inputs using a secure execution engine established using a group of servers. The secure execution engine can include: a circuit configured to execute a secure virtual machine, wherein the secure virtual machine is configured for secure execution of any desired computer program; a secure multi-party computation protocol that distributes processing tasks among the group of computing devices; and a multi-party oblivious random access memory (ORAM) protocol for memory access by the group of computing devices. Further aspects and embodiments of this disclosure are described in detail below.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
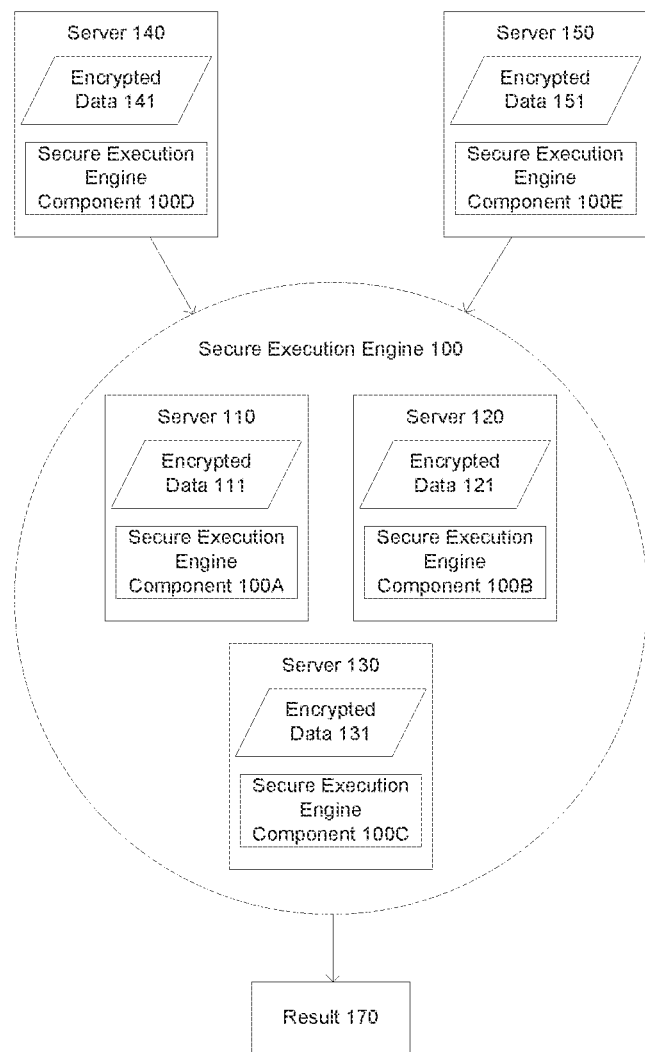
FIG. 1 illustrates an example secure execution engine, in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details, and without applying to any particular networked environment or standard.

FIG. 1 illustrates an example secure execution engine, in accordance with various aspects and embodiments of the subject disclosure. The example secure execution engine 100 can be established by a group of servers 110, 120, 130. Each of the servers 110, 120, 130 can include an instance of a secure execution engine component, for example, server 110 can include secure execution engine component 100A, server 120 can include secure execution engine component 100B, and server 130 can include secure execution engine component 100C. In an embodiment, secure execution engine components 100A, 100B, and 100C can each comprise a substantially identical or similar secure execution engine program installed at each of the servers 110, 120, 130. Secure execution engine components 100A, 100B, and 100C can cooperate to provide the secure execution engine 100.

The secure execution engine 100 can execute computer programs that process encrypted data. The encrypted data can optionally be supplied by, e.g., any one or more of the servers 110, 120, 130. For example, server 110 can supply encrypted data 111 for processing by a program executed by the secure execution engine 100. Server 120 can similarly supply encrypted data 121. Server 130 can similarly supply encrypted data 131.

Furthermore, the encrypted data can optionally be supplied by other computing devices that are not included in the secure execution engine 100. Example server 140 can run another instance of a secure execution engine component 100D, and while the server 140 is not included in the secure execution engine 100, the server 140 can nonetheless use secure execution engine component 100D to supply encrypted data 141 for processing by the secure execution engine 100. Similarly, example server 150 can run another instance of a secure execution engine component 100E, and while the server 150 is not included in the secure execution engine 100, the server 150 can nonetheless use secure execution engine component 100E to supply encrypted data 151 for processing by the secure execution engine 100. Additional servers (not shown in FIG. 1) can optionally supply further encrypted data for processing by the secure execution engine 100.

The secure execution engine 100 can execute a program that uses encrypted data inputs, e.g., encrypted data 111, 121, 131, 141, and/or 151 to compute results, such as example result 170. The result 170 can optionally be shared with servers 110, 120, 130, 140, and/or 150 as appropriate for particular embodiments. For example, in some embodiments, the result 170 can be shared with the servers 110, 120, and 130 included in the secure execution engine 100. In other embodiments, the result 170 can be shared with the servers 110, 120, 130, 140, and/or 150 which supplied the encrypted data 111, 121, 131, 141, and/or 151 for processing by the secure execution engine 100. In a further embodiment, the result 170 can be shared with all servers 110, 120, 130, 140, and 150, or any limited subset of the servers 110, 120, 130, 140, and/or 150, or any other devices or entities, as may be desired for particular embodiments.

The secure execution engine 100 can operate using secure multi-party computation protocols, described further herein, that do not reveal encrypted data to other devices. For example, the secure execution engine 100 can use encrypted data 111 to calculate the result 170 without revealing encrypted data 111 to any of the other servers 120, 130, 140, and/or 150. Likewise, any of the other encrypted data 121, 131, 141, and/or 151 can be used to calculate result 170 without revealing such encrypted data to the other servers illustrated in FIG.

In an example according to FIG. 1, the different servers 110, 120, 130, 140, and/or 150 can be operated by different organizations, each organization having its own encrypted data. Using the secure execution engine 100, the organizations can collaborate to calculate the result 170 without revealing their encrypted data to one another. In an embodiment wherein instances of the secure execution engine component 100A, 100B, 100C, etc. are made available as an installable component, the organizations can install secure execution engine components 100A, 100B, 100C, etc. at their respective servers and can proceed to conduct secure, collaborative processing of private inputs without large investments in developing a cryptographic processing platform.

Figure 2:
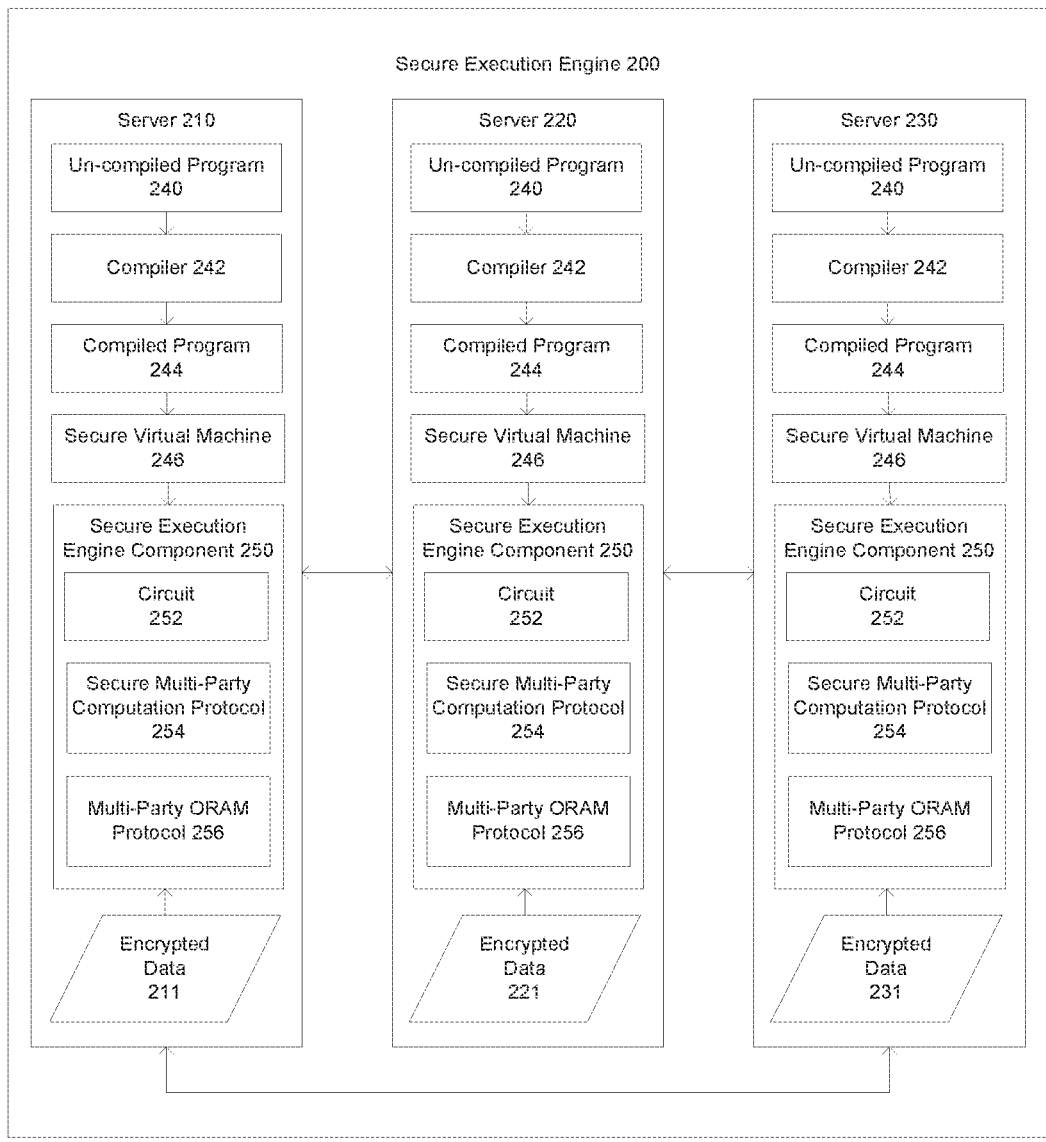
FIG. 2 illustrates example components of servers included in the secure execution engine, in accordance with various aspects and embodiments of the subject disclosure.

FIG. 2 illustrates example components of servers included in the secure execution engine, in accordance with various aspects and embodiments of the subject disclosure. FIG. 2 includes a secure execution engine 200 established by a group of servers comprising server 210, server 220, and server 230. The secure execution engine 200 can implement the secure execution engine 100, introduced in FIG. 1, and the servers 210, 220, and 230 can implement the servers 110, 120, and 130, introduced in FIG. 1. Furthermore, similar to FIG. 1, the servers 210, 220, and 230 can optionally supply encrypted data 211, 221, 231 for processing by the secure execution engine 200.

In FIG. 2, each of the servers 210, 220, and 230 can comprise various substantially identical components, which are given like identifiers for simplicity of description. The components include a secure execution engine component 250, which can implement the secure execution engine components 100A, 100B, 100C, 100D, and 100E introduced in FIG. 1. The secure execution engine component 250 can include a circuit 252, a secure multi-party computation protocol 254, and a multi-party ORAM protocol 256.

Furthermore, FIG. 2 illustrates a secure virtual machine 246 which can be executed by the secure execution engine component 250. The secure virtual machine 246 can, in turn, execute a compiled program 244. The compiled program 244 can be generated by a compiler 242 based on an un-compiled program 240. In some embodiments, one or more of the secure virtual machine 246, the compiler 242, and optionally one or more compiled programs 244 and un-compiled programs 240 can be included in the secure execution engine component 250.

FIG. 2 includes arrows to illustrate interactions between the servers 210, 220, and 230. In general, the compiled program 244 can be executed on a platform comprising the secure virtual machine 246 and the secure execution engine component 250. The platform can ensure that processing tasks are distributed among the servers 210, 220, and 230 and otherwise conducted according to this disclosure in a manner that does not allow reconstruction of encrypted data 211, 221, and/or 231 at any of the other servers. In some embodiments, an individual server obtains no information about the input data, nor any intermediate state of the computation. This can include the trace of the program execution, the memory state, and the call stack.

Using an architecture such as illustrated in FIG. 2, the secure execution engine 200 can enable secure execution of un-compiled programs such as 240, i.e., computer programs implemented in high-level programming languages, such as C or C++. In an embodiment, the compiler 242 can include a front-end compiler to compile and translate input source code to a language-independent intermediate representation, and back-end compiler that transforms the intermediate representation into a sequence of instructions for the virtual machine 246. The sequence of instructions for the virtual machine 246 can include machine code based on an instruction set architecture of the virtual machine 246, which can be specifically tailored for secure execution.

The virtual machine 246 can comprise memory partitioned into words, which can be, by default, 64-bit, and, by default, 16 registers. The instruction set for the virtual machine 246 can be chosen to be universal yet small, to reduce the size of the circuit executing it. Besides the small instruction set, several extensions can be included that are better suited to capture various workloads. The instructions can be encoded using encoding designed to simplify the decoding procedure to reduce the size of the circuit used for decoding.

The binary encoding of the virtual machine 246 can be executed securely on the group of three servers 210, 220, and 230 which implement the secure execution engine 200. The secure execution engine 200 can comprise the circuit 252, the secure multi-party computation protocol 254, and the multi-party ORAM protocol 256.

The circuit 252 can comprise an optimized circuit for executing virtual machine 246 instructions. Optimizations can be done manually and/or automatically using circuit synthesis tools. The secure multi-party computation protocol 254 can comprise a protocol for three parties with information-theoretical security, which can be used for the secure execution of the circuit 252. The multi-party ORAM protocol 256 can be used for secure memory accesses (to load instructions and to read/write the memory) and can be integrated into the secure multi-party computation protocol 254. The ORAM protocol can use an ORAM construction, described herein, which can utilize three servers to obtain improved efficiency compared to two-server solutions.

Figure 3:
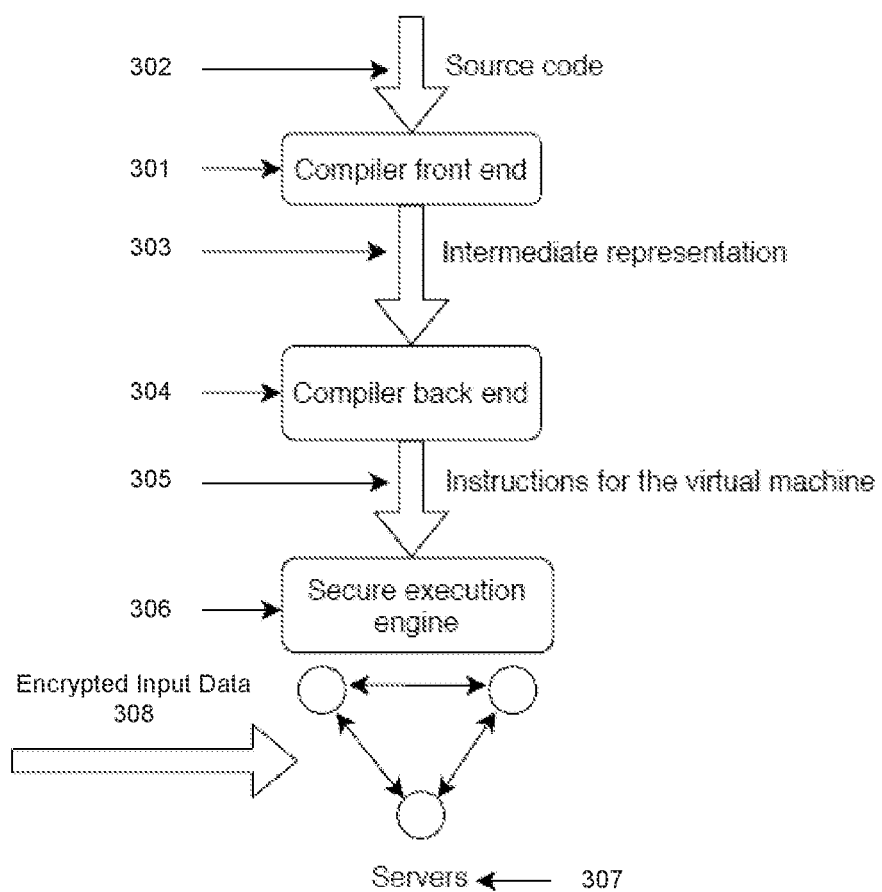
FIG. 3 illustrates example operation of a system comprising a front-end compiler, a back-end compiler, and a secure execution engine, in accordance with various aspects and embodiments of the subject disclosure.

FIG. 3 illustrates example operation of a system comprising a front-end compiler, a back-end compiler, and a secure execution engine, in accordance with various aspects and embodiments of the subject disclosure. In FIG. 3, a compiler front-end 301 can receive source code 302 of a program written in a high-level programming language. Compiler front-end 301 can generate a language-independent intermediate representation 303 of the source code 302. A compiler back-end 304 can convert the intermediate representation 303 into a sequence of instructions 305 for a virtual machine. In FIG. 3, the virtual machine is included in the secure execution engine 306 and is not illustrated separately. The virtual machine can be tailored for efficient, secure execution. The secure execution engine 306 can securely execute the instructions 305. The secure execution engine 306 can comprise three servers 307 that collectively store encrypted input data 308 and computation state, which includes memory state and the instruction pointer, in secret-shared form to avoid information leakage.

The compiler front-end 301 can convert a source code 302 program, written in a high-level programming language, into a language-independent intermediate representation 303. In some embodiments, compiler front-end 301 can be configured to convert source code 302 written in a programming language such as C, C++, Rust and/or another programming language. Embodiments can optionally include multiple different compiler front-end 301 components, adapted to compile source code 302 of different programming languages.

The compiler back-end 304 can be configured to convert the intermediate representation 303 into a sequence of instructions for the virtual machine. The virtual machine can be designed specifically for the purpose of secure execution and can optionally also be as efficient as possible. The virtual machine can comprise a memory including words of a certain size, which can be chosen depending on the application. An example default size value is 64 bits. Besides memory, the virtual machine can have registers whose size can be the same as memory words. The number of registers can vary; an example default value is 16. In some embodiments, the virtual machine can have a Harvard architecture, and a dedicated program counter can be used to address the code being executed. The size of the program counter can be, e.g., one word.

Figures 4, 5:
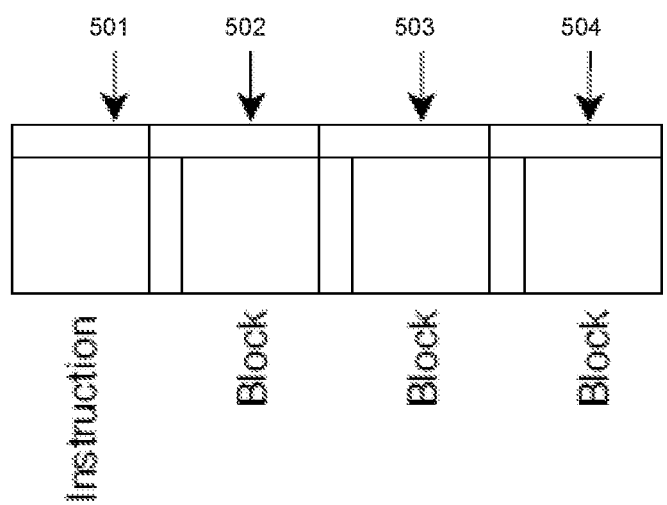
FIG. 4 illustrates an example set of instructions supported by a virtual machine, in accordance with various aspects and embodiments of the subject disclosure.
FIG. 5 illustrates an example encoding mechanism for instructions, in accordance with various aspects and embodiments of the subject disclosure.

FIG. 4 illustrates an example set of instructions supported by a virtual machine, in accordance with various aspects and embodiments of the subject disclosure. The set of instructions included in FIG. 4 comprises: assign x y 401, jump x 402, bge x y z 403, bgeu x y z 404, add x y z 405, sub x y z 406, and x y z 407, or x y z 408, xor x y z 409, shl x y z 410, shr x y z 411, and shra x y z 412. Arguments of the instructions 401-412 denoted by x, y, and z can comprise memory locations, registers, or constants. In some embodiments, memory locations can be given by a constant or a register with a possible constant offset. Instructions that have three arguments can have a register as a first argument, and registers or constants as the second and the third arguments. The assign instruction 401 can have a memory location or register as the first argument, and a memory location, register or constant as the second argument. Both of its arguments cannot be memory locations at the same time. The jump instruction 402 can have a register or a constant as its only argument.

The assign instruction 401 can assign the value of the second argument to the first argument. The jump instruction 402 can set the program counter to the value of the first argument. The bge 403 and the bgeu 404 instructions can perform a conditional branch: program counter gets set to the third argument if the first argument is at least the second argument (bgeu performs an unsigned comparison, while bge performs a signed comparison). The add 405 and sub 406 instructions add and subtract, respectively, the second and the third argument and put the result into the first argument. The and 407, the or 408 and the xor 409 instructions can perform the respective logical operation to the second and the third argument and put the result into the first argument. The shl 410, shr 411 and shra 412 instructions can perform left shift, right shift or right arithmetic shift, respectively, of the second argument by the third argument and put the result into the first argument.

Some embodiments can furthermore include extensions of the instruction set illustrated in FIG. 4. For example, an extension that additionally allows multiplications, an extension which allows floating-point operations, and an extension that provides an extended instruction set can be included. The extended instruction set can support memory, arithmetic, and bitwise operations on vectors of words, enabling optimizations for scientific computing and artificial intelligence (AI) workloads.

FIG. 5 illustrates an example encoding mechanism for instructions, in accordance with various aspects and embodiments of the subject disclosure. Embodiments can use a binary encoding according to FIG. 5 to store and later execute instructions such as the instructions introduced in FIG. 4. In an example embodiment, each instruction can be encoded as four 64-bit words. The last three of these words can contain constants used in the three arguments. If an argument does not use a constant, the respective word can be set to an arbitrary value. The first word can have the instruction ID encoded in its first 4 bits 501, then there are three 6-bit blocks 502, 503, 504, one for each argument. The first two bits of a block can encode whether a given argument is a constant, register, memory location with a constant address, or memory location with a base address stored in a register. The last 4 bits of a block can encode a register ID used in the argument (as an argument itself or a base for the memory location address).

A redundant encoding approach such as illustrated in FIG. 5 allows for a simpler decoding procedure. Furthermore, the illustrated encoding approach does not place restrictions on the constants used within arguments: they can be arbitrary 64-bit words. Alternatively or in addition to the illustrated encoding approach, embodiments can provide a more space-efficient version of the encoding, where every instruction is stored as a single word, and the number of bits in the constants is thus limited by this constraint. Such an encoding variant is more suitable for the scenarios where the amount of memory for the code is limited, or the code is to be sent over the network.

Calling conventions can be established in order to compile for the virtual machine. Embodiments can maintain a downward growing call stack explicitly in the main memory. The following three registers can be used for special purposes: register 0 for the stack pointer, register 1 for the frame pointer, and register 2 for the return address. Other registers can be partitioned into caller-saved and callee-saved. The values of caller-saved registers can be saved and later restored by the code that calls a function, while the values of callee-saved registers can be saved and later restored by the code of the function being called.

In order to be able to execute code for the virtual machine securely, embodiments can represent instruction execution in the form of a Boolean circuit and calls to a memory controller. The circuit can be used within a secure multi-party computation framework, while the memory controller can be implemented using an ORAM protocol. In an example embodiment, instruction execution can be performed in four stages, as shown in FIG. 6.

Figure 6:
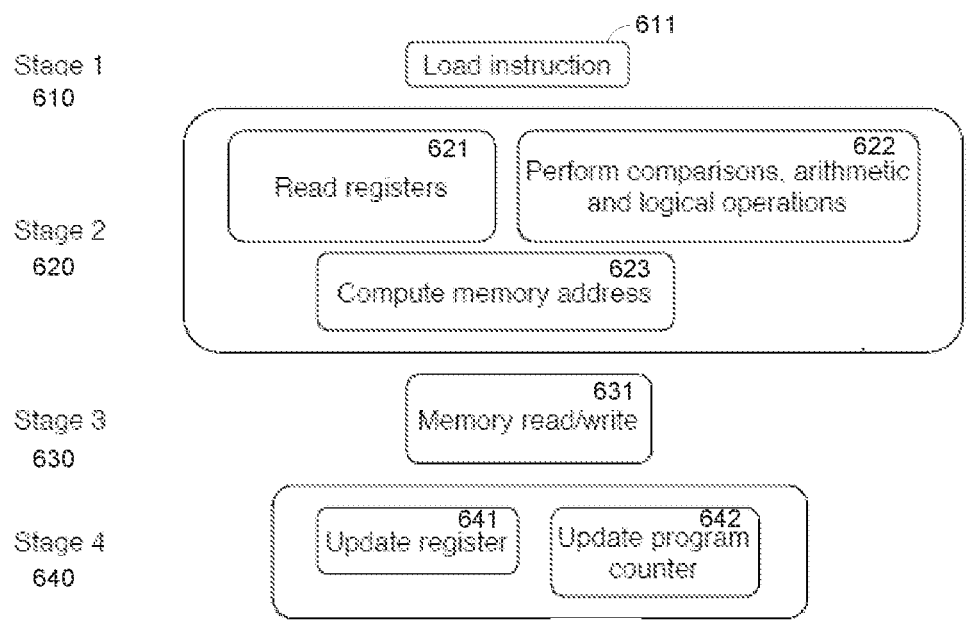
FIG. 6 illustrates an example circuit configured to execute a secure virtual machine, in accordance with various aspects and embodiments of the subject disclosure.

FIG. 6 illustrates an example circuit configured to execute a secure virtual machine, in accordance with various aspects and embodiments of the subject disclosure. The example circuit can implement, e.g., the circuit 252 introduced in FIG. 2. The example circuit can comprise four stages for instruction evaluation: stage 1 610, stage 2 620, stage 3 630, and stage 4 640.

During the first stage 610, a load instruction 611 operation can perform a memory read using a program counter as an address to retrieve the binary encoding of an instruction to be executed.

During the second stage 620, a sequence of operations, encoded as a circuit, can be performed. First, a read registers 621 operation can read values from the registers. Since we represent this computation as a circuit, read registers 621 can read three registers even though the actual instruction executed might need just one or two of them. Second, perform comparisons, arithmetic and logical operations 622 can perform the operations (e.g., addition, subtraction, and, or, xor, right and left shifts, and comparison) on the read values and constants. Again, since it is a circuit, all of these operations can be included. The part of the circuit that performs addition can be reused for two purposes: first, for an actual addition, second, for computing memory locations to be read or written down the line as a sum of the base address and the offset. Third, compute memory addresses 623 can compute the register (which can be written to later) as well as the memory address to be read or written.

For the third stage 630, a memory read/write 631 operation can read and write from/to a memory location. In an embodiment, memory read/write 631 can be implemented using a single access ORAM operation.

Finally, for the fourth stage 640, also implemented as a circuit, update register 641 can update a value of a register to be changed, and update program counter 642 can update a value of a program counter.

Figure 7:
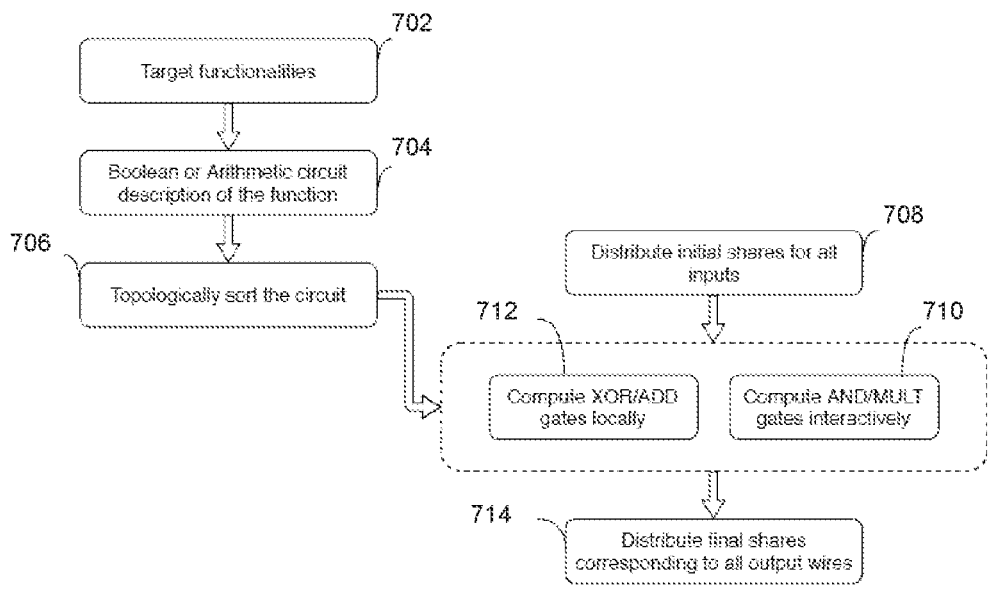
FIG. 7 illustrates an example secure multi-party computation protocol, in accordance with various aspects and embodiments of the subject disclosure.

FIG. 7 illustrates an example secure multi-party computation protocol, in accordance with various aspects and embodiments of the subject disclosure. The example secure multi-party computation protocol can implement, e.g., the secure multi-party computation protocol 254 introduced in FIG. 2. The example secure multi-party computation protocol includes target functionalities 702, Boolean or arithmetic circuit description of the function 704, topologically sort the circuit 706, distribute initial shares for all inputs 708, compute XOR/ADD gates locally 712, compute AND/MULT gates interactively 710, and distribute final shares corresponding to all output wires 714.

In general, the secure multi-party computation protocol can be configured to receive descriptions of target functionalities 702 and execute a program on private data provided by multiple parties. The secure multi-party computation protocol can provide a core functionality of the secure execution engine, e.g., secure execution engine 200. A goal of the secure multi-party computation protocol can be to compute an outcome of a given function that receives inputs from multiple parties without revealing any information (to any party) other than the output of the function.

The illustrated example secure multi-party computation protocol can operate in two different modes: (i) Boolean circuit mode, and (ii) arithmetic circuit mode. Based on a target functionality of target functionalities 702, Boolean or arithmetic circuit description of the function 704 can create either a Boolean or an arithmetic circuit that corresponds to the target functionality.

The Boolean circuit mode can be interpreted as a special case of an arithmetic circuit mode, in which each secret has a length of one bit. The secure multi-party computation protocol can rely on correlated randomness which can be defined as: given three random elements of a certain ring $x_1$, $x_2$, and $x_3$, which satisfy the constraint that $x_1+x_2+x_3=0$. In the Boolean circuit mode, $x_1$, $x_2$, $x_3 \in \{0, 1\}$, while in the Arithmetic circuit mode, $x_1$, $x_2$, $x_3 \in \mathbb{Z}_{2^n}$.

In an initial phase of the secure multi-party computation protocol, in the Boolean circuit mode, at distribute initial shares for all inputs 708 each input holder can securely distribute the shares of the private input $v \in \{0, 1\}$ as follows: A Party-1's ($P_1$) share can be the pair $x_1$, $a_1$ where $a_1=x_3 \oplus v$. A Party-2's ($P_2$) share can be the pair $x_2$, $a_2$ where $a_2=x_1 \oplus v$. A Party-3's ($P_3$) share can be the pair $x_3$, $a_3$ where $a_1=x_2 \oplus v$. Here $x_1, x_2, x_3$ is a correlated-random triple. It can be observed that any two shares are enough to reconstruct the secret v. $P_1$, $P_2$, and $P_3$, can be implemented by, e.g., server 210, server 220, and server 230, respectively.

Once all the inputs to the Boolean circuit are distributed across three parties, each gate within the circuit can be securely evaluated. Prior to securely evaluating the gates, topologically sort the circuit 706 can be performed in order to avoid deadlocks during the protocol execution.

Securely evaluating the gates can use operations 710 and 712. At compute XOR/ADD gates locally 712, in order to securely evaluate XOR gates, each party $P_1$, $P_2$, and $P_3$ can locally compute the XOR of the shares corresponding to each operand of the XOR gate. Each XOR computation can be carried out on each component of the shares separately. In other words, assuming that party i holds the pairs $(x_i, a_i)$ and $(y_i, b_i)$ as shares of the first and second operands, v1 and v2, respectively, each party locally can compute the shares of the result as $(x_1 \oplus y_1, a_1 \oplus b_1)$.

At compute AND/MULT gates interactively 710, evaluating an AND gate can comprise two phases. In the first phase, Party-1 can compute: $r_1=x_1y_1 \oplus a_1 b_1 \oplus \alpha$. Party-1 can send $r_1$ to Party-2. Party-2 can compute: $r_2=x_2y_2 \oplus a_2 b_2 \oplus \beta$. Party-2 can send $r_2$ to Party-3. Party-3 can compute: $r_3=x_3y_3 a_3 b_3 \oplus \gamma$. Party-3 can send $r_3$ to Party-1; where: $\alpha$, $\beta$, $\gamma$ satisfy the condition of a valid correlated randomness. It can be shown that $r_1$, $r_2$, and $r_3$ are valid shares of the AND computation where: $r_1 \oplus r_2 \oplus r_3 = v_1 v_2$. In the second phase, each party can locally compute and store a pair $(z_i, r_i)$ where: $z_i=r_{i-1}$ and i−1=3 if i=1.

The secure multi-party computation protocol in the arithmetic circuit mode can operate as follows. The arithmetic mode is compatible with arbitrary finite fields and the ring modulo 2n for any positive integer n. Given three random elements: $x_1$, $x_2$, $x_3 \in \mathbb{Z}_{2^m}$, where $x_1+x_2+x_3=0$, each party can receive a share of private value v as $(x_i, a_i)$ where $a_i=x_{i-1}-v$ and i−1=3 for i=1. Each share does not reveal any information about the private value v, since each share can be seen as the encryption of v using one-time pad encryption.

At compute XOR/ADD gates locally 712, addition gates within the arithmetic circuit can be evaluated by each party locally. Each party can compute the component-wise addition of the shares of two operands.

At compute AND/MULT gates interactively 710, to evaluate multiplication gates, each party i can compute:

$$r_i = \frac{a_i b_i - x_i y_i + \alpha}{3}$$

and can send it to the Party i+1; where $(x_i, a_i)$ and $(y_i, b_i)$ are arithmetic shares of each operand held by Party i, and $\alpha$, $\beta$, $\gamma$ satisfy the condition of a valid correlated randomness in $\mathbb{Z}_{2^n}$. After the new exchange, each party can store its shares as $(z_i=r_{i-1}-r_i, c_i=-2r_{i-1} r_i)$.

At the end of the secure multi-party computation protocol, at distribute final shares corresponding to all output wires 714, each party can reveal their shares of the output wires in the circuit such that each party (or a subset of parties) can compute the plaintext values of the final result.

In some embodiments, the secure multi-party computation protocol can be further optimized by packing multiple secret shares in a single word on modern computing platforms. The packing mechanism can enable operations to be performed simultaneously on multiple secrets. In certain parts of the protocol and during the output recovery process, the embedded bits within each word can be extracted.

In some embodiments, the secure multi-party computation protocol can guarantee the confidentiality of the input data provided by each party, even in scenarios where one party is corrupted. The corrupt party may deviate from the protocol but is unable to recover any secret information from the protocol transcript.

Embodiments of the secure multi-party computation protocol can be secure in the information-theoretic model, in which the data is protected from adversaries with potentially unbounded computational capabilities. This is in contrast to computationally-secure protocols where the protocol is secure against polynomial-time adversaries under plausible computational assumptions.

In some embodiments of the secure multi-party computation protocol, each party can communicate with one other party only. This simplifies communication and increases the efficiency of the overall protocol.

Embodiments can employ either of two example approaches to create correlated randomness. The first approach is an interactive information-theoretic non-cryptographic approach that works as follows. Each party $P_i$ can generate a random bit $r_i \in \{0, 1\}$ and sends it to the party $P_{i+1}$. A final correlated randomness held by each party is $r_i \oplus r_{i+1}$. This approach increases the communication per AND gate from one bit to two bits.

The second approach to generate correlated randomness is a computationally secure non-interactive method. This approach requires a pseudo-random function F: $\{0, 1\}^k \times \{0, 1\}^k \rightarrow \{0, 1\}$, where k is a desired security parameter (e.g., k=128). In the initial phase, each party $P_i$ can choose a random binary string $s_i \in \{0, 1\}^k$ and send it to $P_{i-1}$. In the bit generation phase, given a public counter C (which is incremented in each iteration), each party can compute:

$$x_i = F_{n_s}(C) \oplus F_{k_{i+1}}(C)$$

Figure 8:
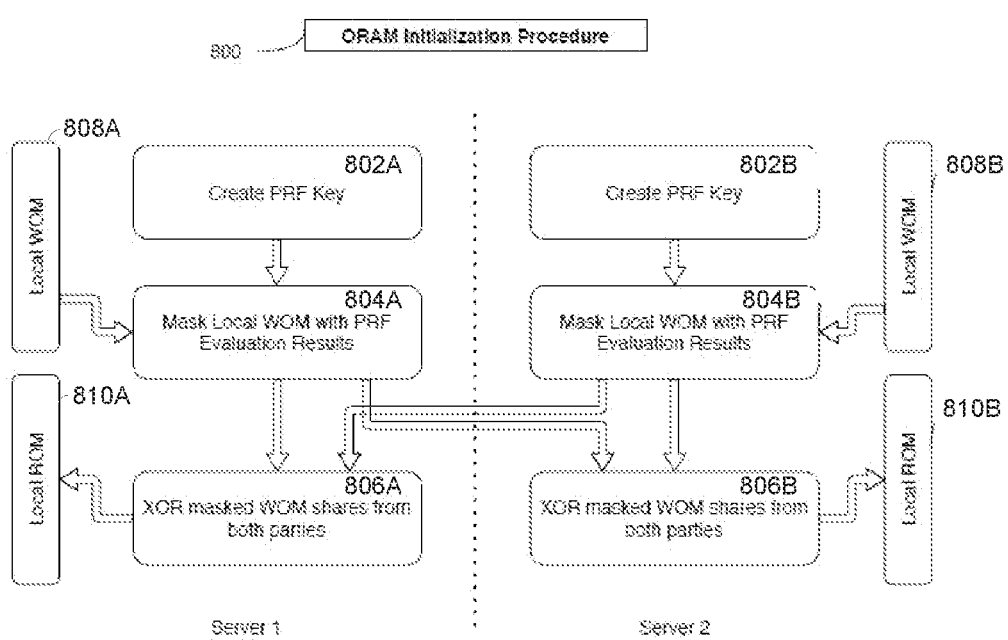
FIG. 8 illustrates an example oblivious random-access memory (ORAM) initialization procedure, in accordance with various aspects and embodiments of the subject disclosure.
Figure 9:
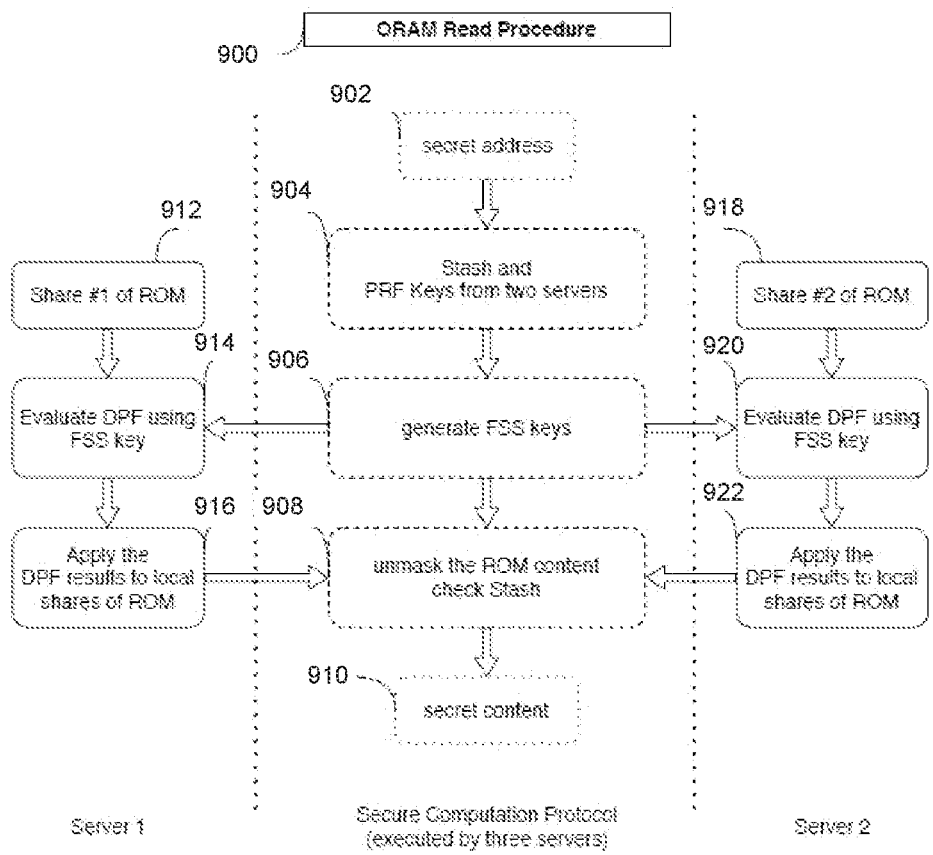
FIG. 9 illustrates an example ORAM read access procedure, in accordance with various aspects and embodiments of the subject disclosure.
Figure 10:
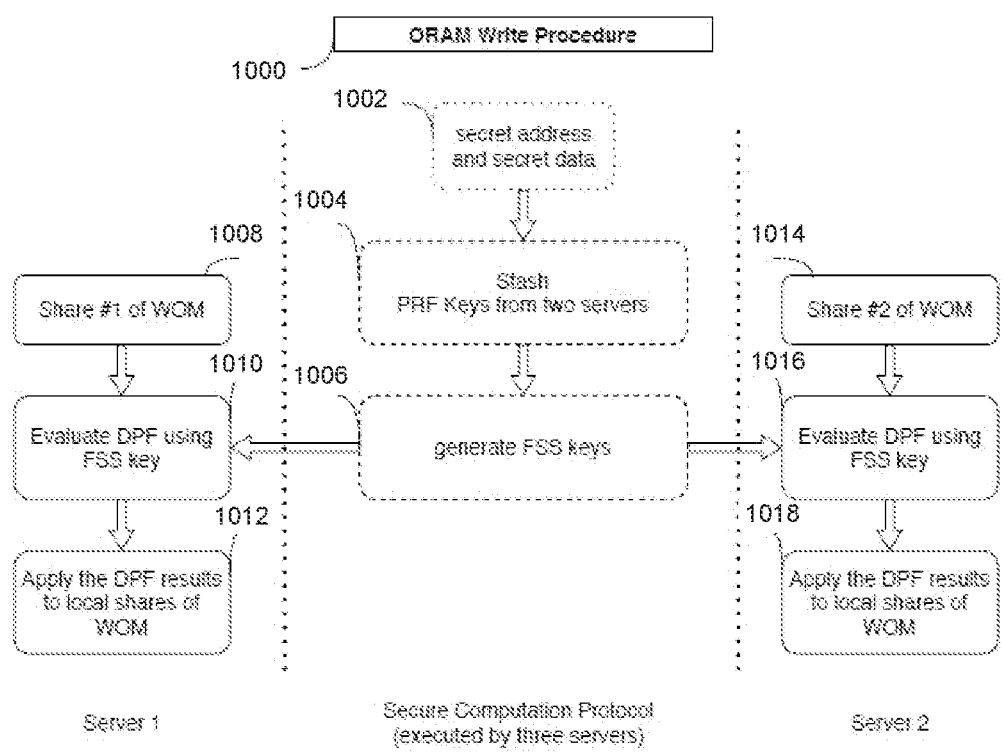
FIG. 10 illustrates an example ORAM write access procedure, in accordance with various aspects and embodiments of the subject disclosure.

FIG. 8, FIG. 9, and FIG. 10 illustrate example oblivious random-access memory (ORAM) protocols, in accordance with various aspects and embodiments of the subject disclosure. FIG. 8 illustrates an example ORAM initialization procedure. FIG. 9 illustrates an example ORAM read access procedure. FIG. 10 illustrates an example ORAM write access procedure.

Embodiments of this disclosure can use ORAM protocols to protect intermediate data and the corresponding memory addresses that are generated within computations, to thereby further secure the private data processed by programs as described herein. In some embodiments, both the memory content as well as the memory access addresses can remain secret. Otherwise, some information about the private data could potentially be leaked.

The example ORAM protocols of FIG. 8, FIG. 9, and FIG. 10 illustrate data and operations at an example server 1 and an example server 2. Server 1 and server 2 can include, e.g., any two out of the three servers 210, 220, or 230 illustrated in FIG. 2. Server 1 and server 2 hold shares of memory contents. Each share does not reveal anything about the underlying content of the memory. FIG. 9 and FIG. 10 also illustrate data and operations employed by the secure multi-party computation protocol which is executed by the three servers 210, 220, and 230.

With reference to the ORAM initialization procedure 800 illustrated in FIG. 8, at the beginning of the protocol, the ORAM construction can be initialized. The ORAM comprises a collection of Read-Only Memory (ROM) including local ROM 810A and local ROM 810B, Write-Only Memory (WOM) including local WOM 808A and local WOM 808B, as well as a stash, and the corresponding algorithms and protocols to access the shared memory. The ORAM initialization procedure 800 can create the appropriate memory structures that can be used during the secure multi-party computation protocol to privately access a secret random location. During the ORAM initialization procedure 800, each of server 1 and server 2 can perform O(n) local computations where n is the size of the memory.

During the ORAM initialization procedure 800, at operations 802A and 802B, each of server 1 and server 2 can create a Pseudo-Random Function (PRF) key. At operations 804A and 804B, each of server 1 and server 2 can mask their respective local WOM with PRF evaluation results. At operations 806A and 806B, each of server 1 and server 2 can XOR their respective masked WOM shares from both parties.

During execution of the secure multi-party computation protocol, a secret address 902 (illustrated in FIG. 9) can be generated within the protocol and each server 210, 220, 230 can hold a share of the secret address 902. An additional server (beyond server 1 and server 2) is present during the secure computation protocol and can engage in a series of steps to acquire shares of the memory content at the secret address 902.

Each of the three servers 210, 220, 230 can input its share again back to the secure computation protocol within which the secret content can be reconstructed and used for the rest of the program execution. There are two copies of the memory held by the two servers (server 1 and server 2), including local ROM 810A and 810B, and local WOM 808A and 808B. Additionally, all three servers can hold secret shares of stash and PRF keys from two servers 904.

FIG. 9 illustrates an example ORAM read access procedure 900. In order to perform each read access procedure 900, each server 210, 220, 230 can engage in the secure computation protocol as well as a linear local computation. The secure computation protocol incurs logarithmic communication and computation costs. The linear local computation incurs non-cryptographic computationally inexpensive local computation and need not include communication.

Per each secure ORAM read access procedure 900, all three servers 210, 220, 230 can engage in the secure multi-party computation protocol and create two Function Secret Sharing (FSS) keys 906 for evaluating a Distributed Point Function (DPF). The DPF can be defined as $f_{a,b}(x)=b$ (if x=a) and =0 (otherwise). Once the FSS keys are generated, two of the servers (server 1 and server 2) that hold secret shares of the memory, namely share #1 of ROM 912 and share #2 of ROM 918, can locally evaluate the DPF for each of the memory locations. Server 1 can evaluate the DPF using an FSS key at operation 914, and server 2 can evaluate the DPF using an FSS key at operation 920.

The FSS key generation procedures 906 can guarantee that the XOR of DPF evaluation by server 1 and server 2, pursuant to operations 914 and 920, is zero for all of the addresses except the one corresponding to a secret address i. At this address, which is associated with the physical address i in the shared memory, the XOR of the DPF evaluation will be one.

As a next step, each of the two servers holding shares of the memory (server 1 and server 2) can apply the DPF results to local shares of ROM 916, 922, e.g., by multiplying the DPF results with their local shares of the memory, element-wise at each location, and XOR the multiplication results. The final number can comprise a true XOR share of the "masked content" at location i.

Server 1 and server 2 can provide their final results as inputs to the secure multi-party computation protocol. At unmask the ROM content check stash 908, the secure multi-party computation protocol can XOR two shares and unmask them using a PRF with keys provided by the server 1 and server 2. The result can comprise secret content 910. Additionally, at 908, the stash can be searched in order to verify that a newer version of the content at location i is not present within stash. If it exists, the newer version from stash can be used as secret content 910. After the computation on the retrieved data is finished, it can be written back to ORAM.

FIG. 10 illustrates an example ORAM write access procedure 1000. FIG. 10 includes, within the secure multi-party computation protocol, secret address and secret data 1002, stash PRF keys from two servers 1004, and generate FSS keys 1006. Data and operations at server 1 include share #1 of WOM 1008, evaluate DPF using FSS key 1010, and apply the DPF results to local shares of WOM 1012. Data and operations at server 2 include share #2 of WOM 1014, evaluate DPF using FSS key 1016, and apply the DPF results to local shares of WOM 1018.

In FIG. 10, in order to write a new secret value at location I at 1002, embodiments can first XOR the new value, old value, and a constant generated by the FSS key generation process at 1006. The result of this computation can be passed to each of the two servers (server 1 and server 2) holding the shared memory. We denote this data as δ. Moreover, the new secret value can be concatenated to the stash at 1004. The secret shares of stash can be updated for each of the three servers 210, 220, 230 accordingly.

Once each server (server 1 and server 2) receives δ, it can multiply δ by the output of FSS evaluation function at each point and XOR it with the integer FSS evaluation result at 1010, 1016. Finally, at 1008, 1014, each server (server 1 and server 2) can XOR the result with WOM content at each location individually, and the WOM can be updated accordingly at 1012, 1018.

The Read and Write operations can be performed for as many times as needed until the stash is full. Once stash is full, the ORAM initialization procedure 800 can be performed again. In an initialization process, the two servers (server 1 and server 2) holding shared memory are involved. Each server can create a PRF key 802A and 802B and evaluate the PRF at each location. Each server can XOR the PRF result at 804A and 804B with WOM 808A and 808B at the given location.

Server 1 and server 2 can share the new masked copy of their memories with each other and they can update the ROM 810A, 810B as the XOR of their masked copies 806A, 806B. The PRF computation and XOR operations in the initialization procedure 800 can be performed in plaintext and outside the secure multi-party computation protocol.

Example ORAM methods according to FIG. 8, FIG. 9, and FIG. 10 can use four computer-readable storage mediums, held by two servers (server 1 and server 2) comprising two computer-readable storage mediums for shares of a read only memory and two computer-readable storage mediums for storing two shares of a write-only memory, as well as three computer-readable storage mediums held by three parties (servers 210, 220, 230) that hold the state of a stash within ORAM. A read access method can retrieve data from the read-only memory without revealing any information about the address or the data to either of the parties. A write access method can receive a new secret data and a private index and securely write the data back to shares of the write-only memory. An initialization method can map initial private data to two secret shares of the read-only memory and map the write-only memory to the read-only memory. The read-only and write-only memories can be shared among two parties (server 1 and server 2), while the read and write access methods can be executed by three parties (servers 210, 220, 230). The initialization method can be executed by two parties (server 1 and server 2).

In some embodiments, the data stored in each medium can be encrypted using one-time pad encryption and pseudo-random function. The memory address as well as the data can be generated within a secure multiparty computation protocol and can be secret shared among the three parties. The state of the stash can be held by three parties however does not reveal any information about parties' private data.

Figure 11:
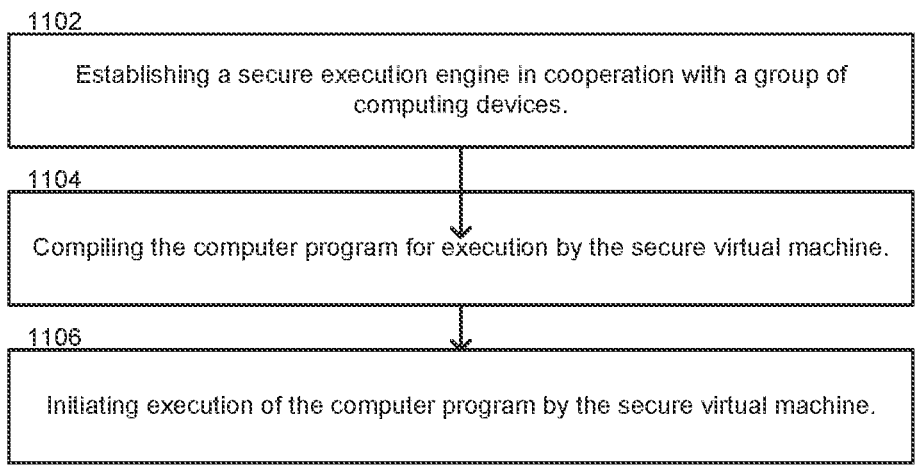
FIG. 11 is a flow diagram representing example operations of a first computing device that participates in establishing a secure execution engine, in accordance with various aspects and embodiments of the subject disclosure.

FIG. 11 is a flow diagram representing example operations of a first computing device that participates in establishing a secure execution engine, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 11 can be performed, for example, by a first computing device such as server 210 which can be configured to cooperate with other computing devices 220, 230 to provide a secure execution engine 200 that securely processes encrypted data such as 211, 221, and/or 231. Operation 1102 comprises establishing a secure execution engine 200 in cooperation with at a group of computing devices, the group of computing devices comprising the first computing device 210, at least one second computing device 220, and at least one third computing device 230. Establishing the secure execution engine 200 can include, e.g., sending and receiving communications among computing devices 210, 220, and 230, which can identify the devices 210, 220, and 230, establish device 210, 220, and 230 roles in connection with the secure execution engine 200, check security information associated with devices 210, 220, and 230, etc.

The secure execution engine 200 can comprise a circuit 252 configured to execute a secure virtual machine 246, wherein the secure virtual machine 246 is configured for secure execution of a computer program 244. The secure virtual machine 246 can be configured to use an instruction set comprising an assignment instruction, a jump instruction, at least two conditional jump instructions, at least two arithmetic instructions, at least three logical instructions, and at least three bitwise shift instructions, e.g., as described in connection with FIG. 4.

The secure execution engine 200 can further comprise a secure multi-party computation protocol 254 that distributes processing tasks associated with the secure execution of the computer program 244, wherein the processing tasks are distributed among two or more devices of the group of computing devices 210, 220, and/or 230.

The secure execution engine 200 can further comprise a multi-party ORAM protocol 256 for memory access of encrypted data 211, 221, and/or 231 for processing according to the processing tasks, wherein the multi-party ORAM protocol 256 is implemented at two or more devices of the group of computing devices 210, 220, and/or 230.

The encrypted data 211, 221, and/or 231 for processing according to the processing tasks can comprise multiple portions of encrypted data, e.g., a first portion comprising encrypted data 211, a second portion encrypted data 221, and so on, and at least two different portions 211, 221 of the multiple portions of encrypted data can be supplied by at least two different computing devices 210, 220. In some embodiments, at least one of the at least two different computing devices can be outside the group of computing devices 210, 220, 230. For example, server 140, illustrated in FIG. 1, can supply a portion of encrypted data, namely encrypted data 141.

Operation 1104 comprises compiling the computer program 244 for execution by the secure virtual machine 246. The compiler 242 can compile the un-compiled program 240 in order to generate the compiled program 244. The compiled program 244 can comprise any computer program compiled for execution by the secure virtual machine 246. The computer program 244 can optionally be compiled independently at each computing device of the group of computing devices 210, 220, 230, or alternatively, the computer program can be compiled externally and provided to the group of computing devices 210, 220, 230, in which case operation 1104 can be omitted.

Compiling the computer program 244 for execution by the secure virtual machine 246 can comprise, for example, generating an intermediate representation of the computer program; mapping the intermediate representation to machine code based on an instruction set used by the secure virtual machine 246, and mapping the machine code to the secure multi-party computation protocol 254, as described further in connection with FIG. 3.

Operation 1106 comprises initiating execution of the computer program 244 by the secure virtual machine 246. The computer program 244 can be executed by the secure virtual machine 246 and secure execution engine 200 using the circuit 252, secure multi-party computation protocol 254, and multi-party ORAM protocol 256 as described herein.

Figure 12:
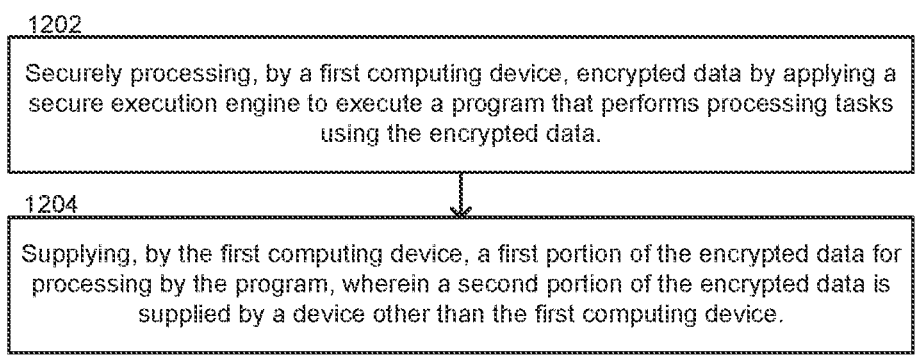
FIG. 12 is a flow diagram representing example operations of a first computing device that supplies encrypted data for processing by a secure execution engine, in accordance with various aspects and embodiments of the subject disclosure.

FIG. 12 is a flow diagram representing example operations of a first computing device that supplies encrypted data for processing by a secure execution engine, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 12 can be performed, for example, by a first computing device such as server 110 equipped with a secure execution engine component 100A. Operation 1202 comprises securely processing, by a first computing device 110, encrypted data, e.g., encrypted data 111, 121, 131, 141, and/or 151 by applying a secure execution engine 100 to execute a program that performs processing tasks using the encrypted data 111, 121, 131, 141, and 151. The secure execution engine 100 can comprise a secure multi-party computation protocol that distributes the processing tasks among two or more computing devices of a group of computing devices, the group of computing devices comprising the first computing device 110, at least one second computing device 120, and at least one third computing device 130.

Operation 1204 comprises supplying, by the first computing device 110, a first portion of the encrypted data, e.g., encrypted data 111 for processing by the program, wherein a second portion of the encrypted data, e.g., encrypted data 121 is supplied by a device 120 other than the first computing device 110.

The performance of operations 1202 and 1204 can alternatively be performed by a device such as server 140 which is not included in the secure execution engine 100. Server 140 can employ the secure execution engine 100 to securely process encrypted data, e.g., encrypted data 141, without itself participating in the secure execution engine 100.

As described herein, the secure execution engine 100 can comprise, in addition to the secure multi-party computation protocol, a circuit configured to execute a secure virtual machine, wherein the secure virtual machine is configured for secure execution of the program, and a multi-party ORAM protocol for memory access of the encrypted data 111, 121, 131, 141, and/or 151 for processing according to the processing tasks, wherein the multi-party ORAM protocol is implemented at two or more devices of the group of computing devices 110, 120, and 130.

In some embodiments, the first computing device 110 can furthermore perform operations such as compiling the program for execution by the secure execution engine 100, resulting in a compiled program. Compiling the program for execution by the secure execution engine 100 can the operations described with reference to operation 1104, included in FIG. 11.

Figure 13:
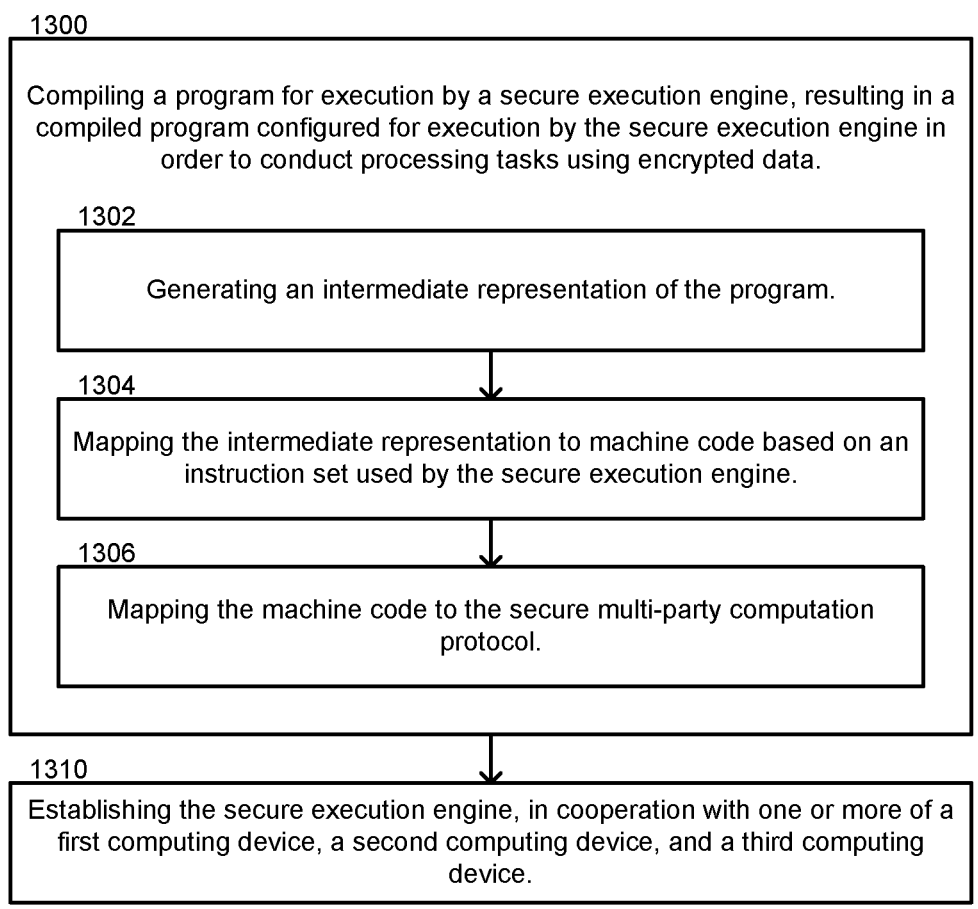
FIG. 13 is a flow diagram representing example operations of a computing device that compiles a program for execution by a secure execution engine, in accordance with various aspects and embodiments of the subject disclosure.

FIG. 13 is a flow diagram representing example operations of a computing device that compiles a program for execution by a secure execution engine, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 13 can be performed, for example, by a computing device such as server 220, which participates in a secure execution engine 200. Operation 1300 comprises compiling a program 240 for execution by a secure execution engine 200, resulting in a compiled program 244 configured for execution by the secure execution engine 200 in order to conduct processing tasks using encrypted data 211, 221, and/or 231. Operation 1300 can be performed by the compiler 242 and can involve operations 1302, 1304, and 1306. In some embodiments, the encrypted data 211, 221, and/or 231 which the compiled program 244 is configured to process can comprise multiple portions of encrypted data, and at least two different portions of the multiple portions of encrypted data, e.g., encrypted data 211 and encrypted data 221, can be supplied by at least two different computing devices 210, 220.

Operation 1302 comprises generating an intermediate representation of the program 240. Operation 1304 comprises mapping the intermediate representation to machine code based on an instruction set used by the secure execution engine. Operation 1306 comprises mapping the machine code to the secure multi-party computation protocol. Operations 1302-1306 are described in connection with FIG. 3.

Operation 1310 comprises establishing the secure execution engine 200, in cooperation with one or more of a first computing device 210, a second computing device 220, and a third computing device 230. As described herein, the secure execution engine 200 for use in connection with FIG. 13 can comprise a secure multi-party computation protocol 254 that distributes processing tasks associated with executing the compiled program 244 among two or more computing devices of a group of computing devices, the group of computing devices comprising the first computing device 210, the second computing device 220, and the third computing device 130. The secure execution engine 200 can further comprise a circuit 252 configured to execute a secure virtual machine 246, wherein the secure virtual machine 246 is configured for secure execution of the compiled program 244. The secure execution engine 200 can further comprise multi-party ORAM protocol 256 for memory access of the encrypted data 211, 221, and/or 231 for processing according to the processing tasks, wherein the multi-party ORAM protocol is implemented at two or more devices of the group of computing devices 210, 220, 230.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Figure 14:
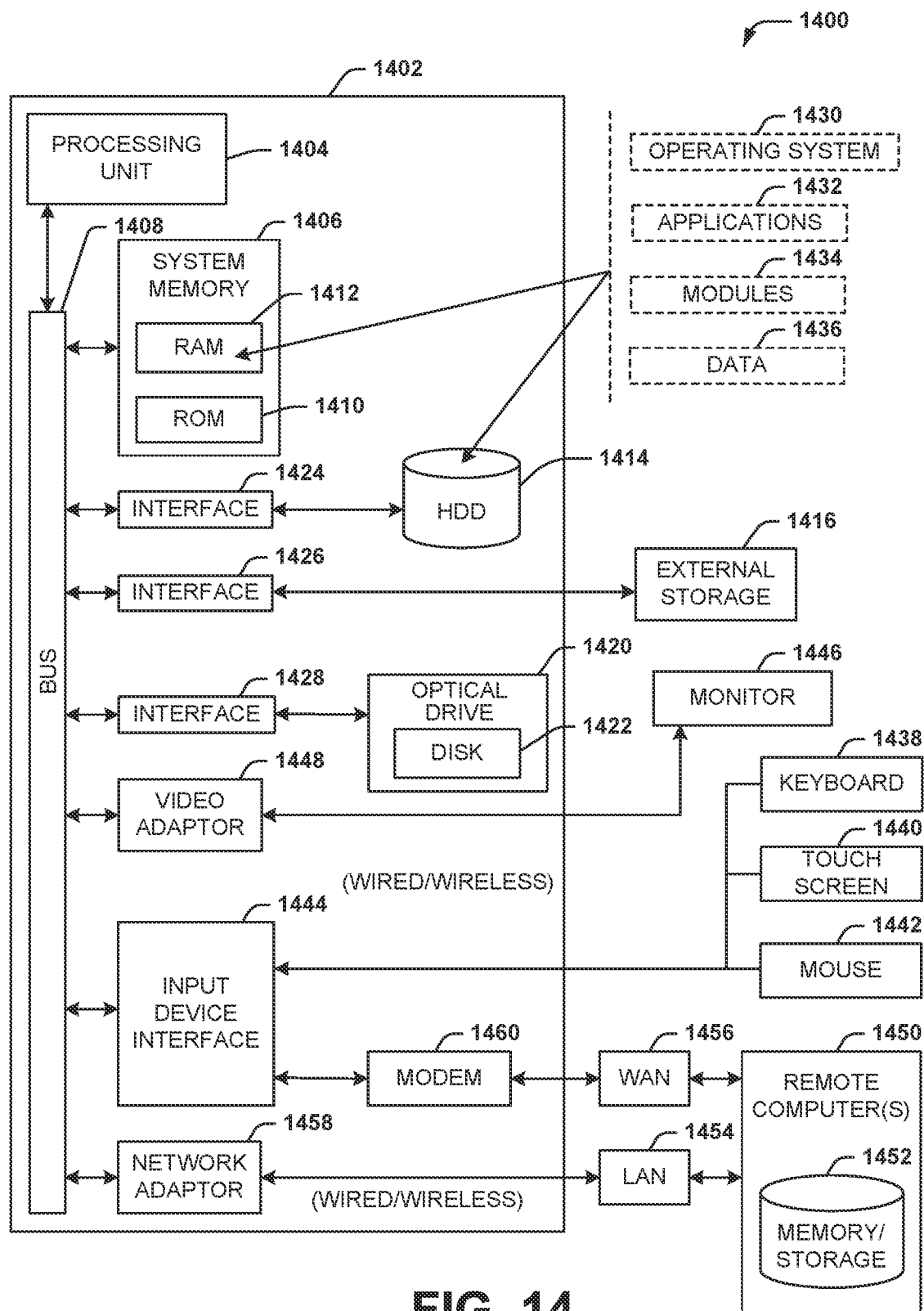
FIG. 14 is a block diagram of an example computer that can be operable to execute processes and methods in accordance with various aspects and embodiments of the subject disclosure.

FIG. 14 is a block diagram of an example computer that can be operable to execute processes and methods in accordance with various aspects and embodiments of the subject disclosure. The example computer can be adapted to implement, for example, any of the various network equipment described herein.

FIG. 14 and the following discussion are intended to provide a brief, general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), smart card, flash memory (e.g., card, stick, key drive) or other memory technology, compact disk (CD), compact disk read only memory (CD-ROM), digital versatile disk (DVD), Blu-ray™ disc (BD) or other optical disk storage, floppy disk storage, hard disk storage, magnetic cassettes, magnetic strip(s), magnetic tape, magnetic disk storage or other magnetic storage devices, solid state drives or other solid state storage devices, a virtual device that emulates a storage device (e.g., any storage device listed herein), or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and an optical disk drive 1420 (e.g., which can read or write from a CD-ROM disc, a DVD, a BD, etc.).

While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enabled with a security module, such as a trusted processing module (TPM). For instance with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A first computing device configured to cooperate with other computing devices to provide a secure execution engine that securely processes encrypted data, the first computing device comprising:
   a processor; and
   a memory that stores executable instructions that, when executed by the processor, facilitate performance of operations, comprising:
      establishing a secure execution engine in cooperation with a group of computing devices, the group of computing devices comprising the first computing device, at least one second computing device, and at least one third computing device;
      wherein the secure execution engine comprises:
         a circuit configured to execute a secure virtual machine, wherein the secure virtual machine is configured for secure execution of a computer program;
         a secure multi-party computation protocol that distributes processing tasks associated with the secure execution of the computer program, wherein the processing tasks are distributed among two or more devices of the group of computing devices; and
         a multi-party oblivious random access memory protocol for memory access of encrypted data for processing according to the processing tasks, wherein the multi-party oblivious random access memory protocol is implemented at two or more devices of the group of computing devices.

2. The first computing device of claim 1, wherein the encrypted data for processing according to the processing tasks comprises multiple portions of encrypted data, and wherein at least two different portions of the multiple portions of encrypted data are supplied by at least two different computing devices.

3. The first computing device of claim 2, wherein at least one of the at least two different computing devices is outside the group of computing devices.

4. The first computing device of claim 1, wherein the computer program comprises any computer program compiled for execution by the secure virtual machine.

5. The first computing device of claim 1, wherein the operations further comprise initiating execution of the computer program by the secure virtual machine.

6. The first computing device of claim 1, wherein the computer program is compiled independently at each computing device of the group of computing devices.

7. The first computing device of claim 1, wherein the secure virtual machine is configured to use an instruction set comprising an assignment instruction, a jump instruction, at least two conditional jump instructions, at least two arithmetic instructions, at least three logical instructions, and at least three bitwise shift instructions.

8. The first computing device of claim 1, wherein the operations further comprise compiling the computer program for execution by the secure virtual machine, and wherein compiling the computer program for execution by the secure virtual machine comprises:
generating an intermediate representation of the computer program;
mapping the intermediate representation to machine code based on an instruction set used by the secure virtual machine; and
mapping the machine code to the secure multi-party computation protocol.

9. A method for secure processing of encrypted data, comprising:
securely processing, by a first computing device comprising a processor, encrypted data by applying a secure execution engine to execute a program that performs processing tasks using the encrypted data;
wherein the secure execution engine comprises a circuit configured to execute a secure virtual machine, wherein the secure virtual machine is configured for secure execution of the program, and a secure multi-party computation protocol that distributes the processing tasks among two or more computing devices of a group of computing devices, the group of computing devices comprising the first computing device, at least one second computing device, and at least one third computing device;
wherein the secure execution engine further comprises a multi-party oblivious random access memory protocol for memory access of the encrypted data for processing according to the processing tasks, wherein the multi-party oblivious random access memory protocol is implemented at two or more devices of the group of computing devices; and
supplying, by the first computing device, a first portion of the encrypted data for processing by the program, wherein a second portion of the encrypted data is supplied by a device other than the first computing device.

10. The method for secure processing of encrypted data of claim 9, wherein the circuit comprises a Boolean or an arithmetic circuit.

11. The method for secure processing of encrypted data of claim 9, further comprising compiling, by the first computing device, the program for execution by the secure execution engine, resulting in a compiled program, wherein compiling the program for execution by the secure execution engine comprises:
generating an intermediate representation of the program;
mapping the intermediate representation to machine code based on an instruction set used by the secure execution engine; and
mapping the machine code to the secure multi-party computation protocol.

12. The method for secure processing of encrypted data of claim 9, wherein the secure virtual machine is configured for secure execution of any of multiple different programs.

13. The method for secure processing of encrypted data of claim 9, wherein the secure virtual machine is configured to use an instruction set for secure execution of the program, and wherein the circuit is configured to execute instructions of the instruction set.

14. A non-transitory machine-readable medium, comprising executable instructions that, when executed by a processor, facilitate performance of operations, comprising:
compiling a program for execution by a secure execution engine, resulting in a compiled program configured for execution by the secure execution engine in order to conduct processing tasks using encrypted data;
wherein the secure execution engine comprises a circuit configured to execute a secure virtual machine, wherein the secure virtual machine is configured for secure execution of the compiled program, and a secure multi-party computation protocol that distributes the processing tasks associated with executing the compiled program among two or more computing devices of a group of computing devices, the group of computing devices comprising a first computing device, a second computing device, and a third computing device;
wherein the secure execution engine further comprises a multi-party oblivious random access memory protocol for memory access of the encrypted data for processing according to the processing tasks, wherein the multi-party oblivious random access memory protocol is implemented at two or more devices of the group of computing devices; and
wherein compiling the program for execution by the secure execution engine comprises:
generating an intermediate representation of the program;
mapping the intermediate representation to machine code based on an instruction set used by the secure execution engine; and
mapping the machine code to the secure multi-party computation protocol.

15. The non-transitory machine-readable medium of claim 14, wherein the operations further comprise establishing the secure execution engine, in cooperation with one or more of the first computing device, the second computing device, and the third computing device.

16. The non-transitory machine-readable medium of claim 14, wherein the circuit comprises a Boolean or an arithmetic circuit.

17. The non-transitory machine-readable medium of claim 14, wherein the encrypted data comprises multiple portions of encrypted data, and wherein at least two different portions of the multiple portions of encrypted data are supplied by at least two different computing devices.

18. The non-transitory machine-readable medium of claim 14, wherein the operations further comprise executing the compiled program using the secure execution engine.

* * * * *